: US008657451B2

(12) United States Patent
Wang et al.

(10) Patent No.: US 8,657,451 B2
(45) Date of Patent: Feb. 25, 2014

(54) DECORATIVE PLATE MODULE FOR PROJECTOR AND PROJECTOR ASSEMBLY

(75) Inventors: Chun-Ping Wang, Hsinchu City (TW); Tzu-Tse Huang, Hsinchu City (TW)

(73) Assignee: Coretronic Corporation, Hsin-chu (TW)

( * ) Notice: Subject to any disclaimer, the term of this patent is extended or adjusted under 35 U.S.C. 154(b) by 302 days.

(21) Appl. No.: 13/323,068

(22) Filed: Dec. 12, 2011

(65) Prior Publication Data

US 2012/0218530 A1 Aug. 30, 2012

(30) Foreign Application Priority Data

Feb. 24, 2011 (CN) .......................... 2011 1 0047267

(51) Int. Cl.
| | | |
|---|---|---|
| G03B 27/54 | (2006.01) | |
| G03B 21/14 | (2006.01) | |
| E05C 19/02 | (2006.01) | |
| E05C 19/06 | (2006.01) | |
| E05C 19/16 | (2006.01) | |
| G06F 1/16 | (2006.01) | |

(52) U.S. Cl.
CPC ............ *G03B 21/145* (2013.01); *E05C 19/022* (2013.01); *E05C 19/063* (2013.01); *E05C 19/165* (2013.01); *G06F 1/1679* (2013.01)
USPC ............. 353/119; 292/8; 292/56; 292/341.14

(58) Field of Classification Search
CPC .... G03B 21/145; G03B 27/54; G06F 1/1679; E05C 19/022; E05C 19/063; E05C 19/165

USPC ............................ 353/119; 292/8, 56, 341.14
See application file for complete search history.

(56) References Cited

U.S. PATENT DOCUMENTS

| | | | |
|---|---|---|---|
| 7,264,362 B2 | 9/2007 | Clark et al. | |
| 7,420,799 B2 * | 9/2008 | Wang ....................... | 361/679.27 |
| 7,677,739 B2 | 3/2010 | Kuroda | |

FOREIGN PATENT DOCUMENTS

TW M385538 8/2010

\* cited by examiner

*Primary Examiner* — Georgia Y Epps
*Assistant Examiner* — Magda Cruz
(74) *Attorney, Agent, or Firm* — Muncy, Geissler, Olds & Lowe, PLLC

(57) ABSTRACT

A decorative plate module for a projector includes a base plate, a first elastic member, a hook member and a second elastic member. The base plate is attached to a periphery of the opening of the front cover and has a first end and a second end opposite to each other. A slide groove is formed on the first end, and the slide groove has an oblique wall. The first elastic member is disposed inside the slide groove and stretches in a first direction, and the hook member is slidably coupled to the slide groove. One end of the hook member leans against the first elastic member, and its another end slidably engages with the front cover. The second elastic member is disposed on a side wall of the slide groove and stretches in a second direction substantially perpendicular to the first direction.

18 Claims, 10 Drawing Sheets

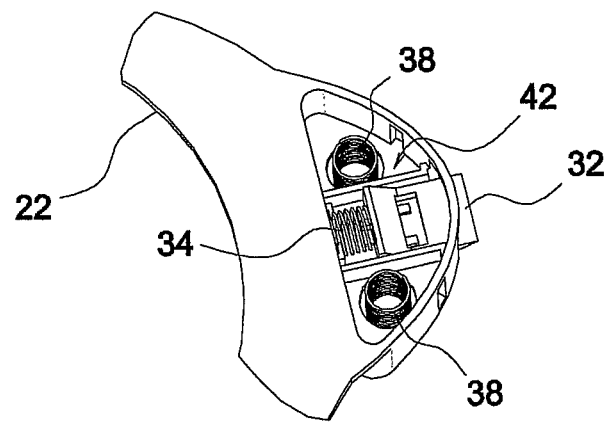
FIG. 7
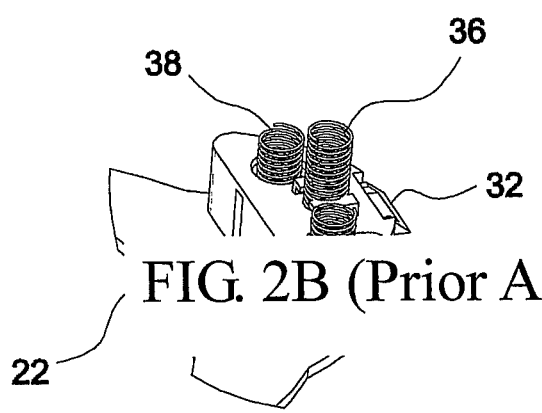
FIG. 2B (Prior Art)
FIG. 8

DECORATIVE PLATE MODULE FOR PROJECTOR AND PROJECTOR ASSEMBLY

BACKGROUND OF THE INVENTION a. Field of the Invention

The invention relates to a decorative plate module for a projector and a projector assembly having the decorative plate module.

b. Description of the Related Art

FIGS. 1A-1C show schematic diagrams illustrating different conventional designs of a detachable element. Referring to FIG. 1A, two hook structures 112 capable of sliding in parallel are respectively formed on two sides of a detachable element 110. Each hook structure 112 is pushed inwardly in a direction indicated by arrows to allow the detachable element 110 to come off a main piece (not shown). However, since a space (encircled by dashed lines shown in FIG. 1A) is needed to allow for the travel of a hook structure 112 upon retraction, a gap is left in the detachable element 110 to spoil the appearance of the detachable element 110. Further, in another conventional design shown in FIG. 1B, a one-way fastening structure is formed on a detachable element 120, and the detachable element 120 may slide outwardly in a direction indicated by an arrow to come off a main piece 130. However, since the detachable element 120 needs to be disposed on a periphery of the main piece 130 to allow the one-way sliding detachable element 120 to come off the main piece 130, the design freedom is severely restricted. Besides, in an alternate conventional design shown in FIG. 1C, a one-way fastening structure is formed on a detachable element 140, and the detachable element 140 may slide outwardly in a direction indicated by an arrow to come off a main piece 150. However, in order to allow the one-way sliding detachable element 140 to come off the main piece 150 and prevent the moving detachable element 140 from interfering with the main piece 150, the detachable element 140 needs to be disposed above the main piece 150 to form a stacked configuration. This may spoil a flat appearance of the main piece 150.

Referring to FIG. 2, U.S. Pat. No. 7,264,362 discloses a projector 200 having a slide rail 202 and a movable front cover 204. The front cover 204 has a lens 206 used to magnify or reduce the multiplying power of a projection lens 208. The front cover 204 may move to enable the lens 206 to be positioned on an optical axis of the projection lens 208 to adjust the multiplying power of the projection lens 208. Taiwan patent no. M385538 discloses a push button structure having a button element, a first inclined plane, a second inclined plane, an elastic portion, a clasp member, a clasp slot and a hook portion. When a user presses the button element to force the button element to move downwards, the second inclined plane pushes the first inclined plane of the clasp member to force the clasp member to move in the opposite direction and to press the elastic portion. Meanwhile, the hook portion of the clasp member moves in a direction opposite the clasp slot and comes off the clasp slot. Further, U.S. Pat. No. 7,677,739 discloses a projection apparatus having a slidable front cover. The slidable front cover may slide inside the projection apparatus and cover a projection lens. A protrusion and a guide tunnel of the projection apparatus cooperate with each other to open or close the slidable front cover.

BRIEF SUMMARY OF THE INVENTION

The invention provides a decorative plate module and a projector assembly having the decorative plate module. The decorative plate module has at least one of the advantages of simplified detachment, beautiful look, high flatness and flexible placement.

Other objects and advantages of the invention may be further illustrated by the technical features broadly embodied and described as follows.

In order to achieve one or a portion of or all of the objects or other objects, one embodiment of the invention provides a decorative plate module for a projector. The projector has a front cover, and the front cover has an opening to allow a projection lens to stick out from the opening. The decorative plate module includes a base plate, a first elastic member, a hook member and a second elastic member. The base plate is attached to a periphery of the opening of the front cover and has a first end and a second end opposite to each other. A slide groove is formed on the first end, and the slide groove has an oblique wall forming an angle with a main plane of the base plate. The first elastic member is disposed inside the slide groove and stretches in a first direction parallel to the main plane of the base plate. The hook member is slidably coupled to the slide groove and leans against the oblique wall, one end of the hook member leans against the first elastic member, and another end of the hook member slidably engages with the front cover. The second elastic member is disposed on a side wall of the slide groove and stretches in a second direction substantially perpendicular to the first direction. When forces are exerted on the hook member in the second direction, the hook member compresses the first elastic member in the first direction and slides relative to the oblique wall of the slide groove to come off the front cover, and the decorative plate module is ejected from the front cover due to the elastic force released by the second elastic member.

In one embodiment, the hook member has an inclined plane, and the inclined plane is parallel to and attached to the oblique wall of the slide groove.

In one embodiment, the hook member compresses the second elastic member when engaging with the front cover.

In one embodiment, the decorative plate module further including at least one third elastic member is disposed on the base plate and beside the second elastic member, and the elastic force of the third elastic member is smaller than the elastic force of the second elastic member.

In one embodiment, each of the first elastic member, the second elastic member and the third elastic member may be a spring.

In one embodiment, a hook structure is formed on the second end of the base plate.

In one embodiment, the second elastic member is positioned between the slide groove and a casing of the projector.

In one embodiment, the hook member has an inclined end surface for engaging with one end of the front cover.

Another embodiment of the invention provides a projector assembly including a casing, a front cover and aforesaid decorative plate module. The front cover is attached to one end of the casing, and the decorative plate module is disposed on the front cover.

The embodiment or the embodiments of the invention may have at least one of the following advantages. According to the above embodiments, a decorative plate may easily come off a projector casing simply by pressing a push button. Therefore, the operation of detaching a decorative plate to replace a projection lens is simplified. Further, the shape of a push button may be designed to conform to the style of a projector, and the push button may be disposed on any position of a projector casing. Compared with conventional designs, the design of a downwardly-pressing push button according to the above embodiments may reduce the retraction travel of a detachable element, keep a projector assembly in good shape, and provide high flatness of a main plane of the projector assembly.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 7 and FIG. 8 respectively show a front side and a back side of a push button mechanism according to an embodiment of the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
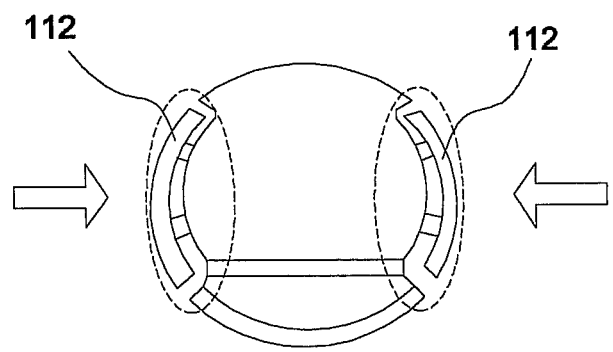
FIGS. 1A-1C show schematic diagrams illustrating different conventional designs of a detachable element.
Figure 1B:
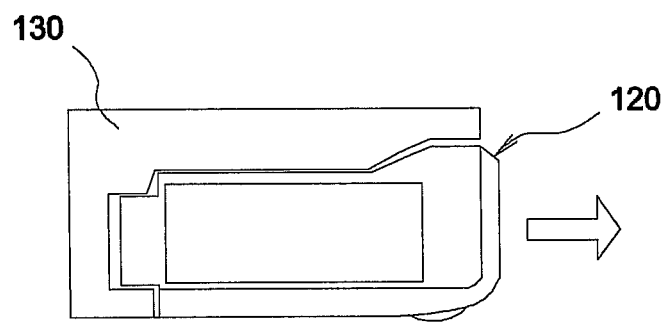
Figure 1C:
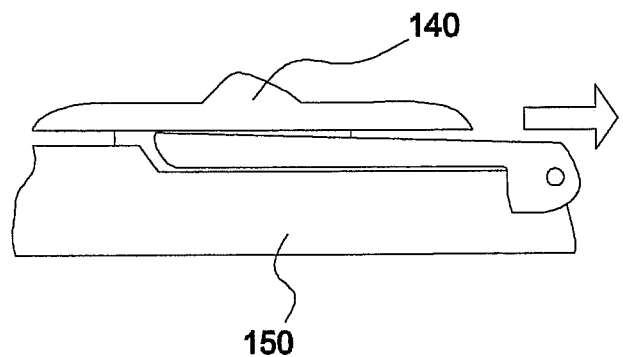
Figure 2:
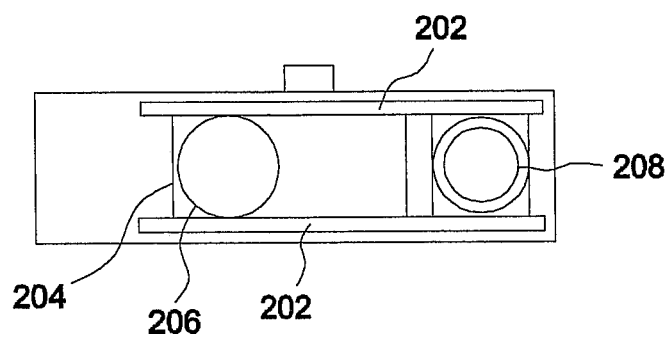
FIG. 2 shows a conventional projector having a movable front cover.
Figure 3A:
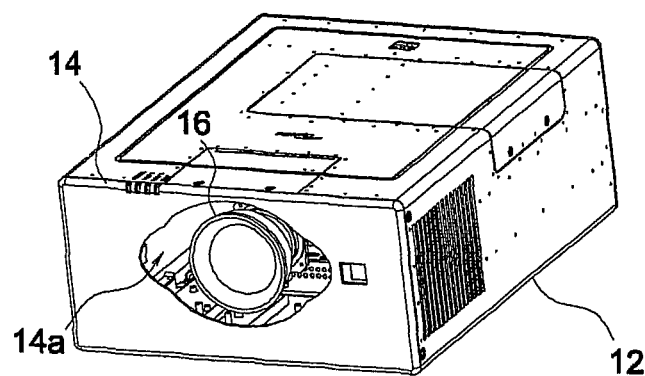
FIG. 3A and FIG. 3B show schematic diagrams illustrating a projector assembly according to an embodiment of the invention.
Figure 3B:
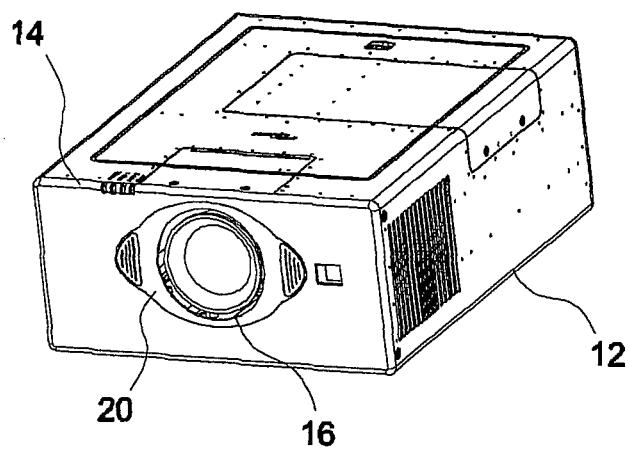

Please refer to both FIG. 3A and FIG. 3B, a projector assembly 10 includes a casing 12 and a front cover 14 attached to one end of the casing 12. The front cover 14 has an opening 14a to allow a projection lens 16 to stick out from the opening 14a. Since a current projector often has a replaceable projection lens, a space between the projection lens 16 and the front cover 14 is needed to allow a user to grab the projection lens 16. Under the circumstance, a detachable decorative plate module 20 is needed to cover the space between the projection lens 16 and the front cover 14 to provide a beautiful look and dust-proof protection.

Figure 4:
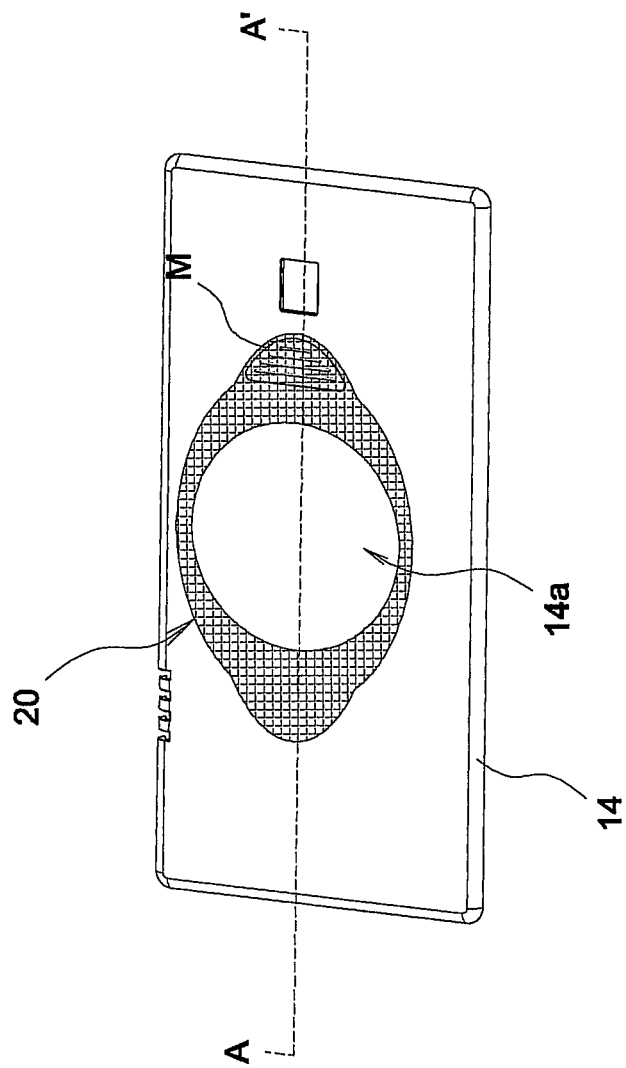
FIG. 4 shows a schematic diagram illustrating an area on a front cover occupied by a decorative plate module according to an embodiment of the invention.
Figure 5:
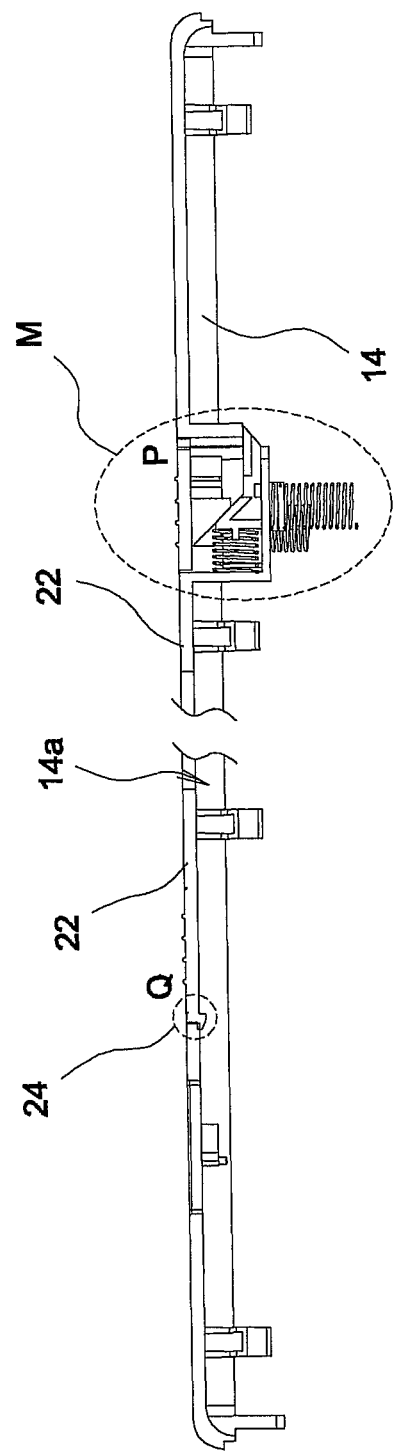
FIG. 5 shows a cross-section cut along line A-A' of FIG. 4.
Figure 6A:
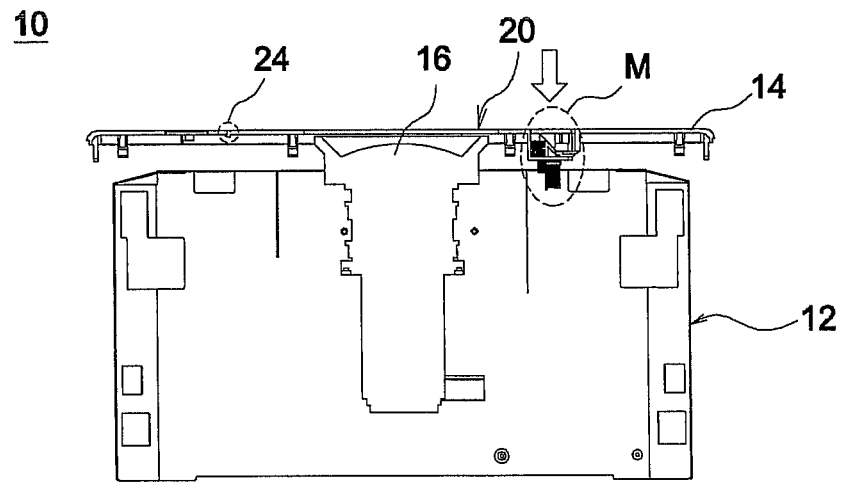
FIG. 6A and FIG. 6B show schematic diagrams illustrating the operation of a decorative plate module according to an embodiment of the invention.
Figure 6B:
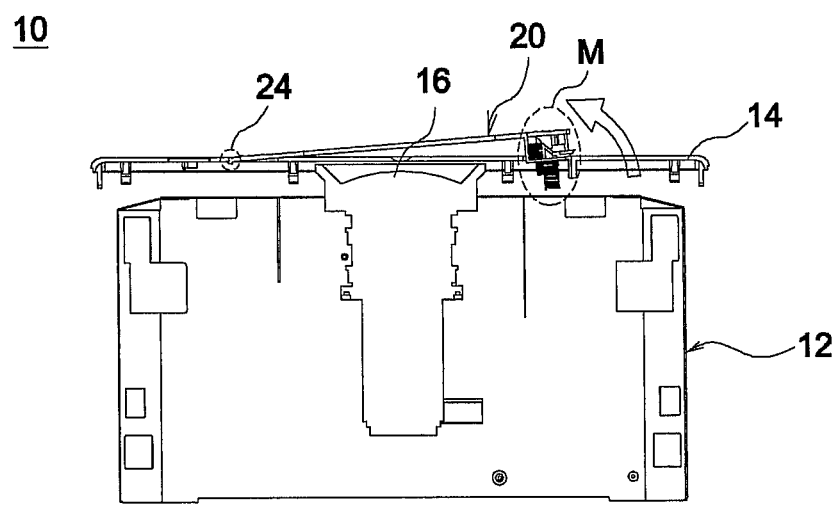

The hatched lines shown in FIG. 4 indicate an area on the front cover 14 occupied by a decorative plate module 20. FIG. 5 shows a cross-section cut along line A-A' of FIG. 4 for illustrating the structure of the decorative plate module 20. Please refer to both FIG. 4 and FIG. 5, in this embodiment, the decorative plate module 20 has a base plate 22, and the base plate 22 is attached to a periphery of the opening 14a of the front cover 14 and has a first end P and a second end Q opposite to each other. A push button mechanism M is disposed on the first end P of the base plate 22, and a hook structure 24 is formed on the second end Q of the base plate 22. The push button mechanism M and the hook structure 24 on two ends of the base plate 22 respectively engage with the front cover 14 to fix the decorative plate module 20 on the front cover 14 and thus cover the space between the projection lens 16 and the front cover 14. When a user presses the push button mechanism M in a direction indicated by an arrow shown in FIG. 6A, the decorative plate module 20 is ejected from the front cover 14 to ease the detachment of the decorative plate module 20, as shown in FIG. 6B. In that case, since the hook structure 24 hangs on one end of the decorative plate module 20, the decorative plate module 20 when ejected still connects with the front cover 14 at one end to not quickly drop from the front cover 14. After the user replaces the projection lens 16, the decorative plate module 20 is fixed on the front cover 14 again simply by pushing back the decorative plate module 20.

FIG. 7 and FIG. 8 respectively show a front side and a back side of a push button mechanism M according to an embodiment of the invention. Please refer to both FIG. 7 and FIG. 8, the push button mechanism M may include a hook member 32, a first elastic member 34, a second elastic member 36 and at least one third elastic member 38. The base plate 22 has a slide groove 42, and the hook member 32 and the first elastic member 34 are disposed inside the slide groove 42. In this embodiment, a stretching direction of the first elastic member 34 is substantially perpendicular to a stretching direction of the second elastic member 36, and two third elastic members 38 are disposed on the base plate 22 and respectively positioned on two sides of the second elastic member 36. The third elastic members 38 provide resilient hand feel when one presses the push button mechanism M, and the elastic force of each third elastic member 38 is smaller than the elastic force of the second elastic member 36. The first elastic member 34, the second elastic member 36 or the third elastic member 38 includes, but is not limited to, a spring, as long as the elastic member is allowed to stretch in a determined direction.

Figure 9A:
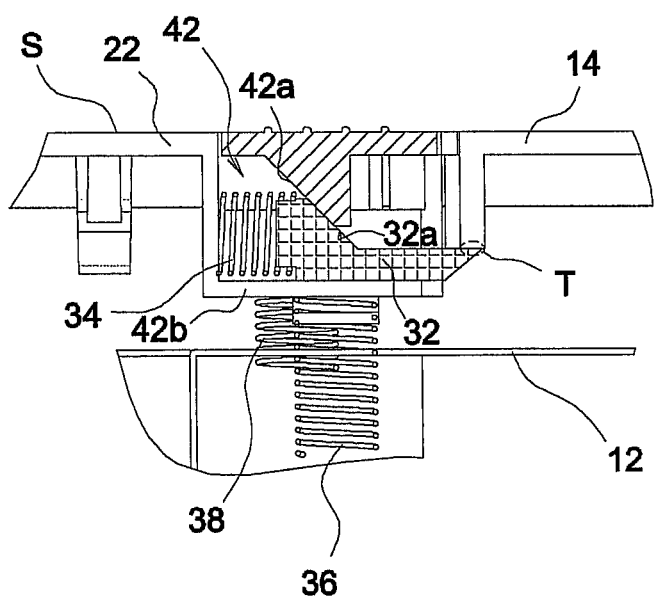
FIGS. 9A-9C show schematic diagrams illustrating the operation of a push button mechanism shown in FIG. 7 and FIG. 8.
Figure 9B:
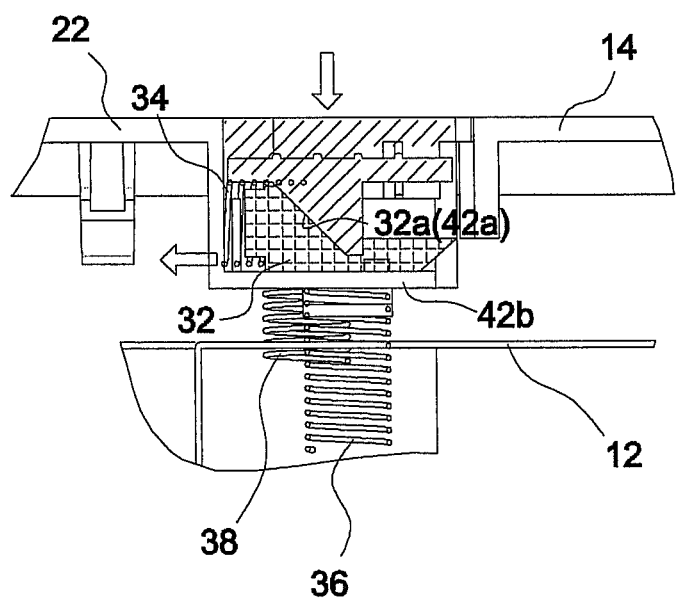
Figure 9C:
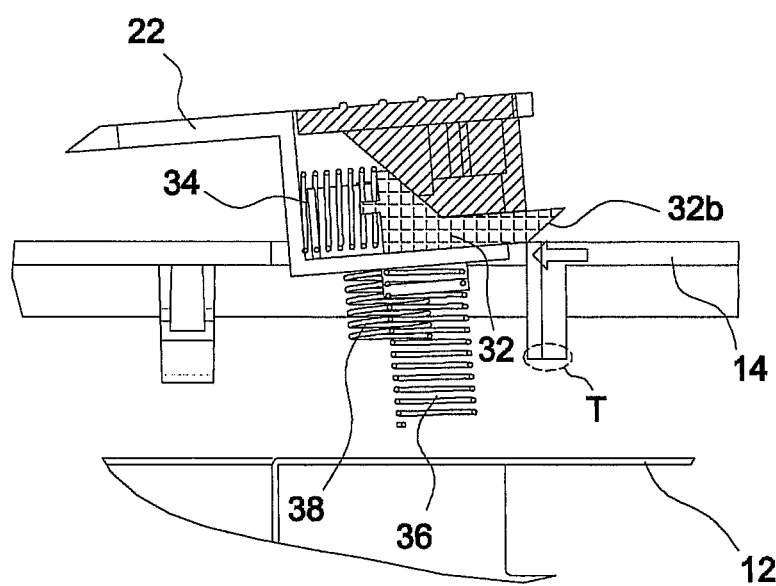

FIGS. 9A-9C show schematic diagrams illustrating the operation of a push button mechanism. Referring to FIG. 9A, the slide groove 42 is formed on the first end P of the base plate 22 to accommodate the hook member 32 and the first elastic member 34, and the slide groove 42 has an oblique wall 42a forming an angle with a main plane S of the base plate 22. The first elastic member 34 is disposed inside the slide groove 42 and stretches in a direction parallel to the main plane S of the base plate 22. The hook member 32 is slidably coupled to the slide groove 42 and leans against the oblique wall 42a of the slide groove 42. In this embodiment, the hook member 32 has an inclined plane 32a, and the inclined plane 32a is parallel to and attached to the oblique wall 42a of the slide groove 42. The second elastic member 36 is disposed on a side wall 42b of the slide groove 42 and positioned between the slide groove 42 and a projector casing 12. The second elastic member 36 stretches in a direction substantially perpendicular to a stretching direction of the first elastic member 34. When the push button mechanism M is fixed on the front cover 14, the hook member 32 compresses the second elastic member 36, one end of the hook member 32 leans against the first elastic member 34, and another end of the hook member 32 engages with the front cover 14 in an engagement region T. As shown in FIG. 9B, when a user downwardly presses the push button mechanism M, the inclined plane 32a of the hook member 32 is forced to slide relative to the oblique wall 42a of the slide groove 42 and compresses the first elastic member 34. As a result, the hook member 32 is allowed to come off the front cover 14 and unfasten the engagement. Meanwhile, the base plate 22 is ejected from the front cover 14 due to the elastic force released by the second elastic member 36. As shown in FIG. 9C, after the user replaces the projection lens 16, the push button mechanism M is pushed onto the front cover 14 again. In this embodiment, an inclined end surface 32b is formed on one end of the hook member 32 engaging with the front cover 14. Therefore, when the hook member 32 is attached to the front cover 14, the inclined end surface 32b leans against the front cover 14 and the hook member 32 naturally slides back in a direction indicated by an arrow until reaches the engagement region T of the front cover 14. When the hook member 32 reaches the engagement region T, the hook member 32 may engage with the front cover 14 again due to the elastic force released by the first elastic member 34.

The embodiment or the embodiments of the invention may have at least one of the following advantages. According to the above embodiments, a decorative plate may easily come off a projector casing simply by pressing a push button. Therefore, the operation of detaching a decorative plate to replace a projection lens is simplified. Further, the shape of a push button may be designed to conform to the style of a projector, and the push button may be disposed on any position of a projector casing. Compared with conventional designs, the design of a downwardly-pressing push button according to the above embodiments may reduce the retraction travel of a detachable element, keep a projector assembly in good shape, and provide high flatness of a main plane of the projector assembly.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Each of the terms "first elastic member" and "second elastic member" is only a nomenclature used to modify its corresponding element. These terms are not used to set up the upper limit or lower limit of the number of elements.

What is claimed is:

1. A decorative plate module for a projector, the projector having a front cover and the front cover having an opening to allow a projection lens to stick out from the opening, the decorative plate module comprising:
    a base plate attached to a periphery of the opening of the front cover and having a first end and a second end opposite to each other, wherein a slide groove is formed on the first end and the slide groove has an oblique wall forming an angle with a main plane of the base plate;
    a first elastic member disposed inside the slide groove and stretching in a first direction parallel to the main plane of the base plate;
    a hook member slidably coupled to the slide groove and leaning against the oblique wall, wherein one end of the hook member leans against the first elastic member and another end of the hook member slidably engages with the front cover; and
    a second elastic member disposed on a side wall of the slide groove and stretching in a second direction substantially perpendicular to the first direction, wherein, when forces are exerted on the hook member in the second direction, the hook member compresses the first elastic member in the first direction and slides relative to the oblique wall of the slide groove to come off the front cover, and the decorative plate module is ejected from the front cover due to the elastic force released by the second elastic member.

2. The decorative plate module for a projector as claimed in claim 1, wherein the hook member has an inclined plane and the inclined plane is parallel to and attached to the oblique wall of the slide groove.

3. The decorative plate module for a projector as claimed in claim 1, wherein the hook member compresses the second elastic member when engaging with the front cover.

4. The decorative plate module for a projector as claimed in claim 1, wherein each of the first elastic member and the second elastic member comprises a spring.

5. The decorative plate module for a projector as claimed in claim 1, further comprising:
at least one third elastic member disposed on the base plate and beside the second elastic member, the elastic force of the third elastic member being smaller than the elastic force of the second elastic member.

6. The decorative plate module for a projector as claimed in claim 5, wherein the third elastic member comprises a spring.

7. The decorative plate module for a projector as claimed in claim 1, wherein a hook structure is formed on the second end of the base plate.

8. The decorative plate module for a projector as claimed in claim 1, wherein the second elastic member is positioned between the slide groove and a casing of the projector.

9. The decorative plate module for a projector as claimed in claim 1, wherein the hook member has an inclined end surface for engaging with one end of the front cover.

10. A projector assembly, comprising:
a casing;
a front cover attached to one end of the casing and having an opening to allow a projection lens to stick out from the opening; and
a decorative plate module disposed on the front cover and comprising:
a base plate attached to a periphery of the opening of the front cover and having a first end and a second end opposite to each other, wherein a slide groove is formed on the first end and the slide groove has an oblique wall forming an angle with a main plane of the base plate;
a first elastic member disposed inside the slide groove and stretching in a first direction parallel to the main plane of the base plate;
a hook member slidably coupled to the slide groove and leaning against the oblique wall, wherein one end of the hook member leans against the first elastic member and another end of the hook member slidably engages with the front cover; and
a second elastic member disposed on a side wall of the slide groove and stretching in a second direction substantially perpendicular to the first direction, wherein, when forces are exerted on the hook member, the hook member compresses the first elastic member in the first direction and slides relative to the oblique wall of the slide groove to come off the front cover, and the decorative plate module is ejected from the front cover due to the elastic force released by the second elastic member.

11. The projector assembly as claimed in claim 10, wherein the hook member has an inclined plane and the inclined plane is parallel to and attached to the oblique wall of the slide groove.

12. The projector assembly as claimed in claim 10, wherein the hook member compresses the second elastic member when engaging with the front cover.

13. The projector assembly as claimed in claim 10, wherein each of the first elastic member and the second elastic member comprises a spring.

14. The projector assembly as claimed in claim 10, further comprising:
at least one third elastic member disposed on the base plate and beside the second elastic member, the elastic force of the third elastic member being smaller than the elastic force of the second elastic member.

15. The projector assembly as claimed in claim 14, wherein the third elastic member comprises a spring.

16. The projector assembly as claimed in claim 10, wherein a hook structure is formed on the second end of the base plate.

17. The projector assembly as claimed in claim 10, wherein the second elastic member is positioned between the slide groove and the casing.

18. The projector assembly as claimed in claim 10, wherein the hook member has an inclined end surface for engaging with one end of the front cover.

* * * * *